United States Patent
Guccione et al.

(10) Patent No.: US 7,870,555 B2
(45) Date of Patent: Jan. 11, 2011

(54) WORKLOAD SCHEDULING METHOD AND SYSTEM WITH IMPROVED PLANNED JOB DURATION UPDATING SCHEME

(75) Inventors: Francesca Guccione, Rome (IT); Simona Sabatini, Vasto (IT)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 11/379,387

(22) Filed: Apr. 20, 2006

(65) Prior Publication Data
US 2006/0242648 A1 Oct. 26, 2006

(30) Foreign Application Priority Data
Apr. 21, 2005 (EP) ................... 05103208

(51) Int. Cl.
*G06F 9/46* (2006.01)
(52) U.S. Cl. .................................. 718/102
(58) Field of Classification Search ............ 718/102
See application file for complete search history.

(56) References Cited

U.S. PATENT DOCUMENTS

| | | | | |
|---|---|---|---|---|
| 6,016,503 | A * | 1/2000 | Overby et al. ............. | 718/104 |
| 6,470,375 | B1 * | 10/2002 | Whitner et al. ............. | 718/105 |
| 6,510,469 | B1 * | 1/2003 | Starnes et al. ............. | 709/247 |
| 2004/0194101 | A1 * | 9/2004 | Glanzer et al. ............. | 718/100 |
| 2004/0199415 | A1 * | 10/2004 | Ho ........................ | 705/8 |

* cited by examiner

*Primary Examiner*—Emerson C Puente
*Assistant Examiner*—Gregory A Kessler
(74) *Attorney, Agent, or Firm*—Garg Law Firm, PLLC; Rakesh Garg; Jeffrey S. LaBaw

(57) ABSTRACT

A method for scheduling execution of a work unit in a data processing system comprises assigning to the work unit an expected execution duration; executing the work unit; determining an actual execution duration of the work unit; determining a difference between the actual execution duration and the expected duration; and conditionally adjusting the expected execution duration assigned to the work unit based on the measured actual execution duration, wherein the conditionally adjusting includes preventing the adjustment of the expected execution duration in case said difference exceeds a predetermined threshold. The method further includes associating to the work unit a parameter having a prescribed value adapted to provide an indication of unconditional adjustment of the expected execution duration: in case said parameter takes the prescribed value, the expected duration assigned with the work unit based on the measured actual execution duration even if the difference in durations exceeds the predetermined threshold.

15 Claims, 4 Drawing Sheets

WORKLOAD SCHEDULING METHOD AND SYSTEM WITH IMPROVED PLANNED JOB DURATION UPDATING SCHEME

TECHNICAL FIELD

The present invention relates to the data processing field. More specifically, the present invention relates to workload scheduling methods and systems, for controlling the execution of processes in data processing systems.

BACKGROUND ART

Workload scheduling methods are commonly used in data processing systems for controlling the execution of different work units, for example jobs in a batch processing.

Several types of workload schedulers have been proposed in the prior art to automate the process of submitting the execution of large quantities of jobs. An example of workload scheduler is the "Tivoli Workload Scheduler" by IBM Corporation.

A workload scheduler is a software component that submits work units, e.g. jobs, for execution according to a predefined sequence, also known as schedule or execution plan; the execution plan establishes a flow of execution of the different jobs according to several factors, such as for example temporal constraints (e.g., date, time, day of the week) and dependencies (such as completion of preceding jobs).

The execution of the jobs requires several hardware and/or software resources, such as data processing apparatuses—personal computers, workstations, server machines—operating systems, software applications, databases, storage devices, output devices and the like. System resources that are to be made available to the jobs are typically managed by another software component, known as the workload manager.

An aspect of paramount importance in scheduling workloads is the knowledge of the duration of the different operations to be performed, i.e. of the different work units, e.g. the different jobs. Knowledge of the jobs' durations is necessary for building the execution plan, because the jobs' durations are used to determine when the execution of the generic job has to start. Jobs' durations are also exploited by the workload scheduler to control the correct execution of the jobs and to detect possible abnormal conditions, based on the fact that one or more jobs run(s) longer than the expected (planned) duration(s): in these cases, the workload scheduler may issue alert messages, for example for informing a user of the delay incurred, or used by monitoring software tools, like Netwiev and IBM Tivoli Monitoring by IBM corporation.

Typically, the jobs' planned durations are estimated adopting predetermined prediction methods. The estimation should be as accurate as possible, since a bad prediction of the jobs' durations may cause the workload scheduler to incorrectly declare an abnormal condition in respect of one or more jobs, and issue wrong alert messages.

Some known workload schedulers, like the cited Tivoli Workload Scheduler, implement an adaptive duration estimation scheme for adjusting the jobs' planned durations. Such an adaptive duration estimation scheme calls for applying a "smoothing" factor to the measured, actual duration of a generic job, and to update the planned job duration according to the "smoothed" actual duration. If however the actual job duration differs from the planned duration significantly, i.e., the duration difference exceeds a predetermined limit, the planned duration is not updated.

SUMMARY OF THE INVENTION

The Applicant has observed that this behavior, albeit satisfactory under many respects, has however some drawbacks.

For example, when migrating from a testing data processing environment to an actual, production data processing environment, the planned jobs' durations estimated and used by the workload scheduler when running in the testing environment are usually significantly different from the expected durations of the jobs when the latter are executed in the production environment; this is for example due to the fact that the amounts of data to be processed in the production environment are usually more than those in the testing environment. The known scheme for adaptively adjusting the planned jobs' durations is in these cases almost useless, because the difference between the measured, actual production environment jobs' durations and the planned (testing environment) job's durations usually exceeds the predetermined threshold. The owner of the data processing system is thus requested to re-estimate the jobs' durations, and to manually update most of the planned jobs' durations values, since otherwise the workload scheduling system would decree, for most of the jobs executed, an abnormal duration condition. Changing the previously planned jobs' durations, estimated during the testing phase, is believed to be a heavy task.

The Applicant has found that it would be desirable to improve the currently known workload scheduling methods and systems, so that they can cope with situations like the one described above.

According to an aspect of the present invention, a method as set forth in appended claim 1 for scheduling execution of a work unit in a data processing system is provided for.

The method comprises assigning to the work unit an expected execution duration; executing the work unit; determining an actual execution duration of the work unit; determining a difference between the actual execution duration and the expected duration; and conditionally adjusting the expected execution duration assigned to the work unit based on the measured actual execution duration, wherein said conditionally adjusting includes preventing the adjustment of the expected execution duration in case said difference exceeds a predetermined threshold.

A parameter is associated to the work unit, said parameter having a prescribed value adapted to provide an indication of unconditional adjustment of the expected execution duration. Said conditionally adjusting includes adjusting the expected duration associated with the work unit based on the measured actual execution duration even if said difference exceeds the predetermined threshold in case said parameter takes the prescribed value.

In a preferred embodiment of the invention, after adjusting the expected execution duration, the parameter is set to a value different from said prescribed value, so as to inhibit the unconditional adjustment of the expected execution duration: in this way, if the user sets the parameter to the prescribed value, the unconditional update of the planned job duration can be performed only once, the first time the job is executed; any subsequent unconditional update of the planned job duration needs a specific intervention by the user, who as to deliberately set the parameter to the prescribed value. This allows avoiding to update the expected execution durations (in case of substantial deviations) unless expressly requested by the user.

Further aspects of the present invention relate to a computer program for performing the above-described method, and to a data processing system comprising means for carrying out the steps of the method according to the first aspect of the invention.

BRIEF DESCRIPTION OF THE DRAWINGS

The features and advantages of the present invention will be made apparent by the following detailed description of an embodiment thereof, provided merely by way of a non-limitative example, description that will be conducted making reference to the attached drawings, wherein.

DETAILED DESCRIPTION OF THE PREFERRED EMBODIMENT(S)

Figure 1A:
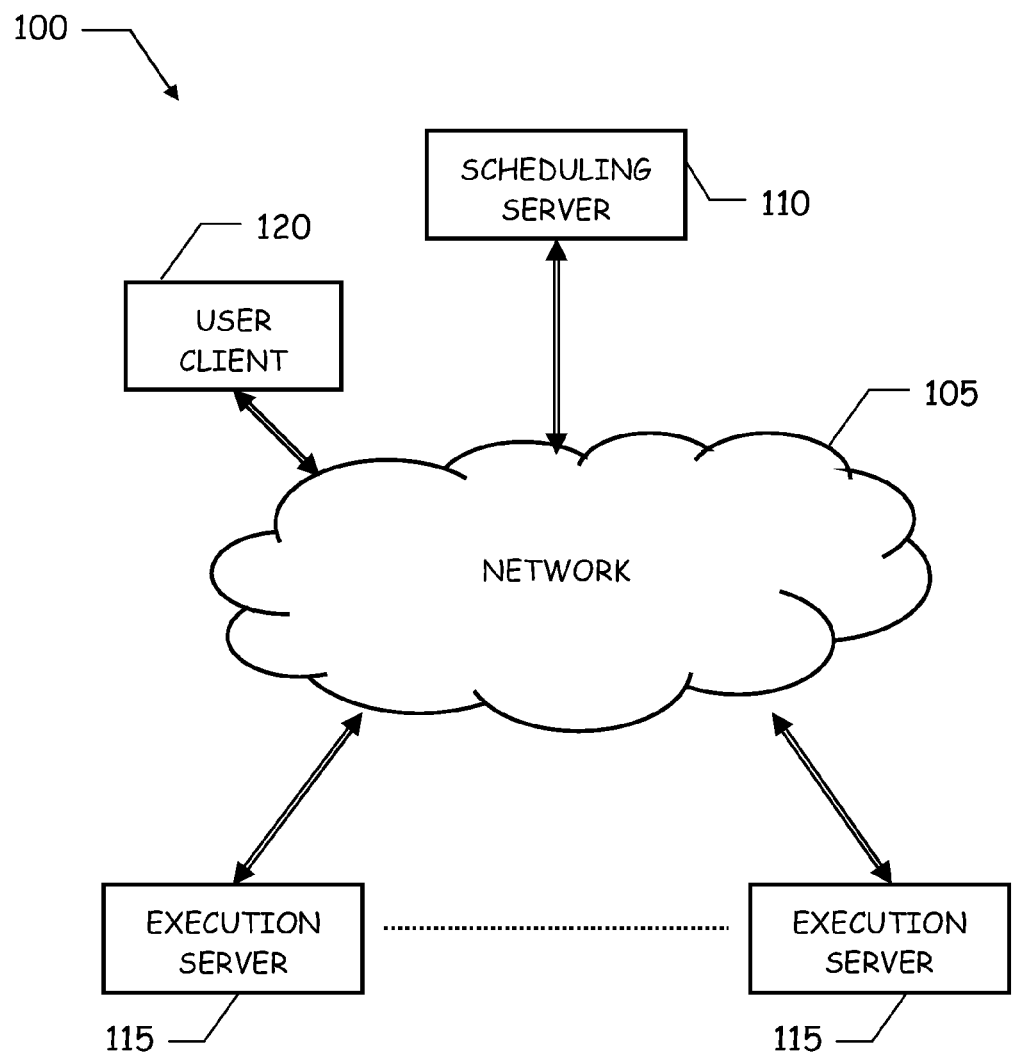
FIG. 1A is a schematic block diagram of a data processing system in which the method according to an embodiment of the present invention is applicable.

With reference in particular to FIG. 1A, a schematic block diagram of an exemplary data processing system 100 is illustrated, in which a method according to an embodiment of the present invention can be applied.

In particular, the exemplary data processing system 100 considered in the invention embodiment being described has a distributed architecture, based on a data communications network 105, which may typically consist in an Ethernet LAN (Local Area Network), a WAN (Wide Area Network), or the Internet. The data processing system 100 may for example be the production environment, i.e., the information infrastructure of a SOHO (Small Office/Home Office environment) or of an enterprise, a corporation, a government agency or the like.

In the data processing system 100, a central scheduling server computer (hereinafter, shortly, scheduling server) 110 is used to submit the execution of jobs, particularly but not limitatively non-interactive jobs such as, for example, payroll programs, cost analysis applications, report generation programs, and the like. The scheduling server 110 interacts with one or more other computers or execution server computers (hereinafter, execution servers) 115, which control the actual execution of one or more of the jobs to be executed, submitted by and under the supervision of the scheduling server 110. The scheduling server 110 and the execution servers 115 communicate through the network 105. Also schematically shown is a generic user client machine (user client) 120, through which a generic user can submit jobs to the scheduling server 110.

Figure 1B:
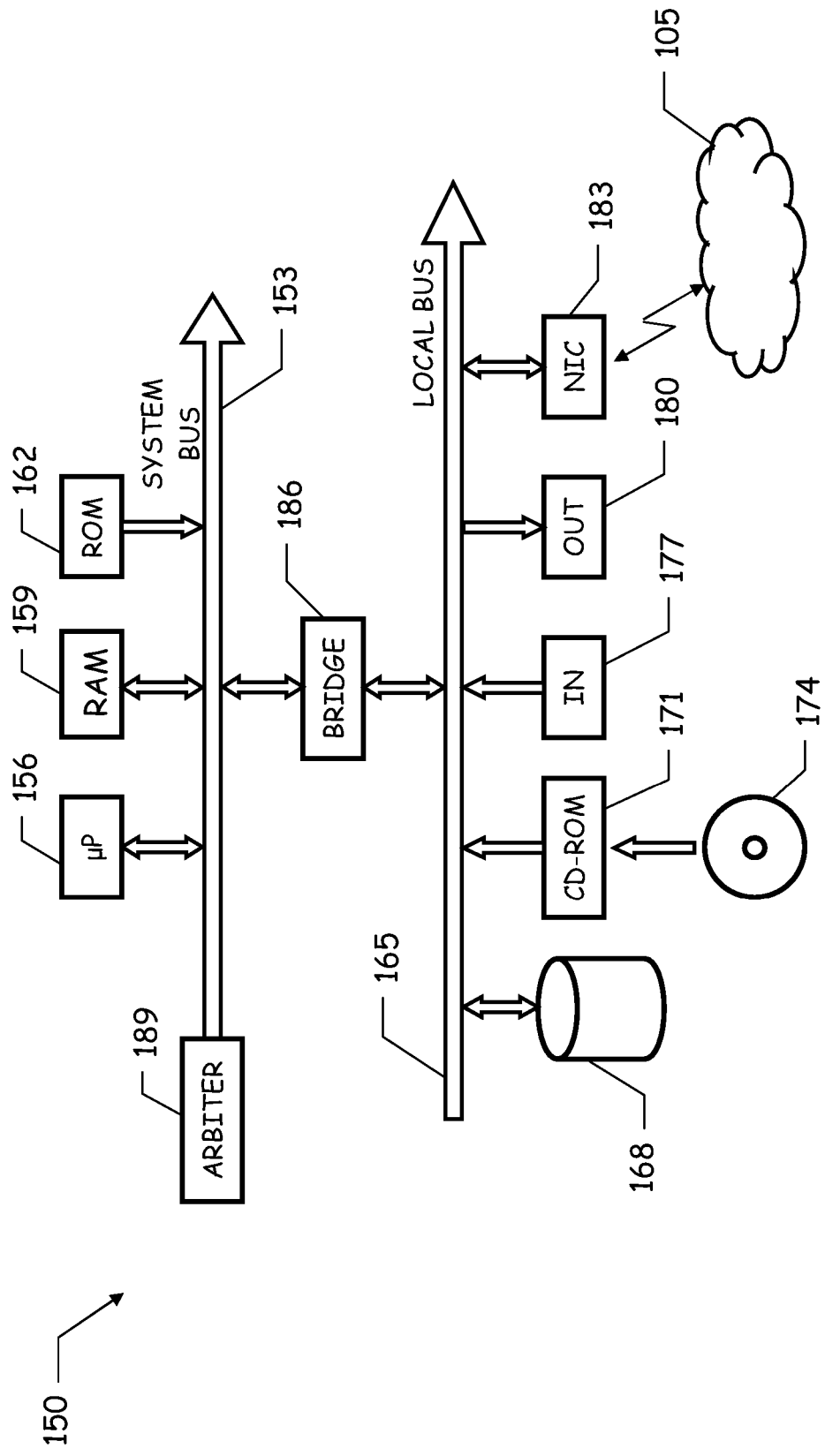
FIG. 1B shows the functional blocks of a generic computer of the data processing system, particularly a scheduling server computer.

As shown in FIG. 1B, a generic computer 150 of the data processing system 100, such as the scheduling server 110 (a same or similar structure is also descriptive of the execution servers 115 or the user client machine 120), is comprised of several units that are connected in parallel to a system bus 153. In detail, one or more microprocessors ($\mu P$) 156 control the operation of the computer 150; a RAM 159 is directly used as a working memory by the microprocessors 156, and a ROM 162 stores the basic code for a bootstrap of the computer 150. Peripheral units are connected (by means of respective interfaces) to a local bus 165. Particularly, mass storage devices comprise a hard disk 168 and a CD-ROM/DVD-ROM drive 171 for reading CD-ROMs/DVD-ROMs 174. Moreover, the computer 150 typically includes input devices 177, for example a keyboard and a mouse, and output devices 180, such as a display device (monitor) and a printer. A Network Interface Card (NIC) 183 is used to connect the computer 150 to the network 105. A bridge unit 186 interfaces the system bus 153 with the local bus 165. Each microprocessor 156 and the bridge unit 186 can operate as master agents requesting an access to the system bus 153 for transmitting information; an arbiter 189 manages the granting of the access to the system bus 153.

Figure 2:
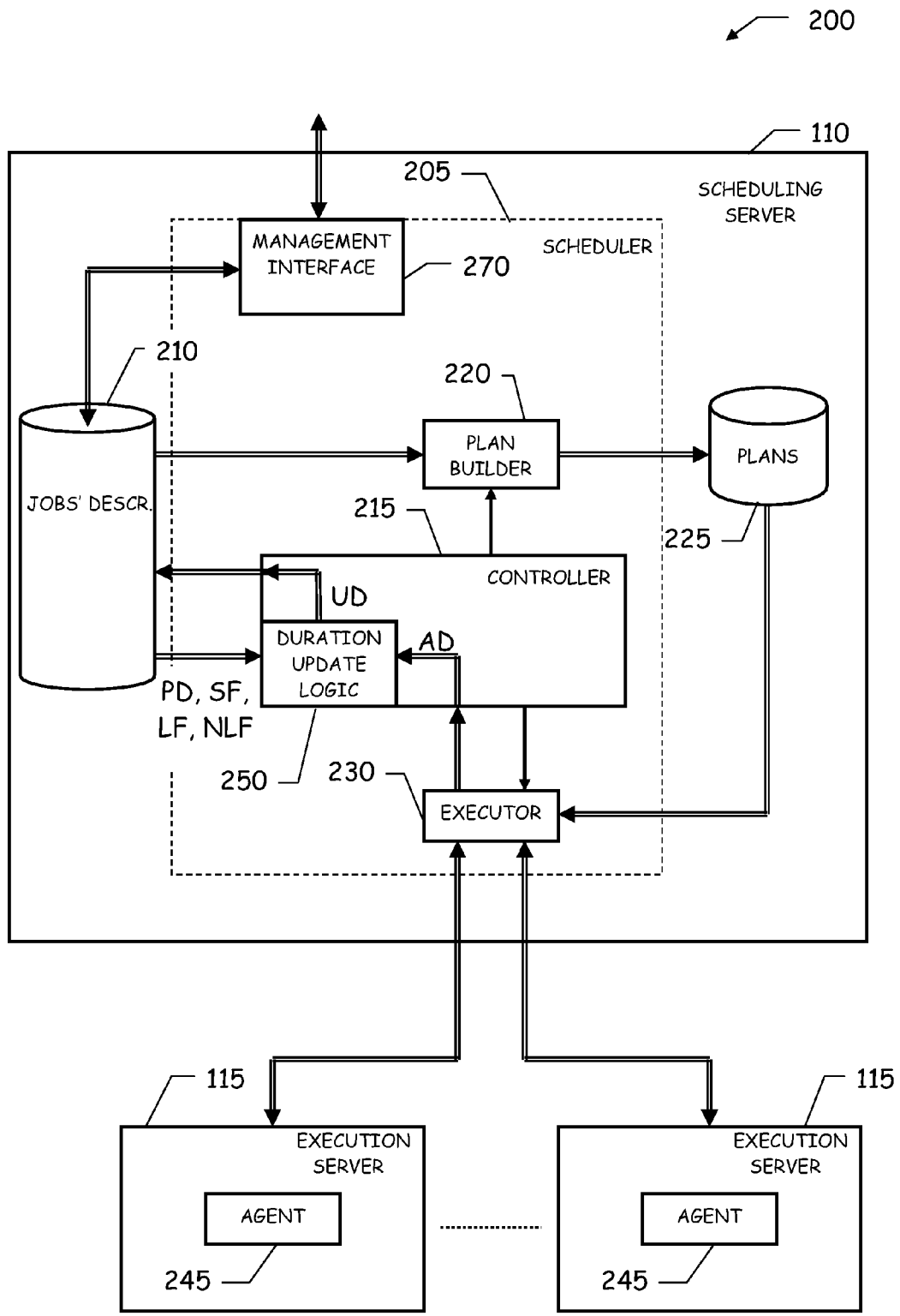
FIG. 2 depicts, in terms of functional blocks, the components, including software components, implementing a method according to an embodiment of the invention.

Referring now to FIG. 2, the components, including software components, implementing a method according to an embodiment of the invention are schematically shown, being denoted as a whole with reference numeral 200. The information (programs and data) is typically stored on the hard disks and loaded (at least partially) into the computers' working memories when the programs are running. The programs are initially installed onto the hard disks from, e.g., CD-ROMs or DVD-ROMs, or they may be downloaded from, e.g., a distribution server machine through the data communications network 105.

Particularly, a workload scheduler 205 runs on the scheduling server 110. The workload scheduler 205 is a software component used to automate the submission of desired jobs in the above-described data processing system 100. The jobs to be executed by the workload scheduler 205 are defined in a workload database 210, which includes, for each job submitted and to be scheduled for execution, a respective job descriptor.

In particular, the job descriptor, identified for example by a job identifier, is a collection of several pieces of information, and contains a description of the program to be executed for the execution of that job, the parameter(s) to be passed to the program to be executed, the resource required for the execution of the program, the scheduling policies.

Table 1 reported below schematizes the content of the descriptors of two generic jobs JOBa and JOBb, limitedly to the fields relevant to the understanding of the invention embodiment herein discussed:

TABLE 1

| JOB ID | PD | LF | SF | NLF |
|--------|-----|-----|-----|-----|
| JOBa | PDa | LFa | SFa | YES |
| JOBb | PDb | LFb | SFb | NO |

Referring to the above Table 1, the job descriptor for the generic job includes a job identifier (JOB ID), an estimated, planned duration of the job (PD), a limit feedback parameter LF, a smoothing factor (SF) and, according to an embodiment of the present invention, a no-limit feedback parameter or flag (NLF). The limit feedback parameter LF sets a value which is used to derive a threshold in a duration updating procedure, said threshold being used for excluding duration updates in case an actual job duration differs too much from the planned job duration. The smoothing factor SF is a value used in the duration updating process for calculating a new planned duration based on the previously stored planned duration and the actual duration, "smoothing" the difference between these two values. The no-limit feedback flag NLF may be used in the duration updating process for forcing the duration update irrespective of the difference between the actual job duration and the planned job duration, as will be explained in detail later on.

The scheduler 205 includes a controller module 215, which transmits information about the jobs to be executed to a plan builder module 220. The plan builder module 220 creates one or more execution plans for controlling a flow of execution of batches of jobs in a desired sequence (for example, covering a period of 24 hours). Each execution plan is built according to the information contained in the job descriptors, extracted by the plan builder module 220 from the workload database 210; for example, the execution plans are built based on the temporal constraints and the dependencies of the jobs, as defined in their descriptors. The plan builder module 220 stores the execution plans thus obtained into a corresponding execution plans repository 225.

The controller module 215 requests the execution of a selected execution plan to an executor module 230. For this purpose, the executor module 230 extracts the definition of the current execution plan to be put in execution from the plans repository 225. The executor module 230 also determines the resources to be used by the job(s) of the execution plan, e.g. which execution servers 115 are to be contacted, and accordingly submits each job in the plan for execution.

Particularly, the executor module 230 interfaces with an agent 245 running in background on each execution server 115; the agent 245 controls the execution of the jobs on the respective execution server 115 in response to corresponding requests received from the executor module 230, and returns thereto feedback information relating to the result of the execution. This feedback information is passed by the executor module 230 to the controller module 215, which, based on the received feedback information, may accordingly update the corresponding jobs' descriptors in the workload database 210. In particular, the feedback information includes information indicative of the actual duration (AD in the drawing) of that particular job.

The controller module 215 includes a duration update logic module 250 entrusted with the task of managing a jobs' durations update procedure. The duration update logic module 250 receives the information about the actual duration AD of the generic job; the duration update logic module 250 retrieves from the workload database 210, for that job, the planned job duration (PD in the drawing), the limit feedback (LF in the drawing), the smoothing factor (SF in the drawing) and the no-limit feedback flag (NLF in the drawing). Based on all these pieces of information, the duration update logic module 250 performs a duration update process which may lead to the determination of an updated planned duration value (UD in the drawing); the updated planned duration value UD is then stored back into the workload database 210 in substitution of the previously stored planned duration value. In particular, as will be described in detail later, the duration update process performed by the duration update logic module 250 is such that the generation of the updated planned duration value UD is conditioned by the status of the no-limit feedback flag and the limit feedback LF.

The scheduler 205 further includes a management interface 270, by which a user, for example a data processing system administrator, may interact with the scheduler 205, particularly for managing the jobs' profiles in the workload database 210, e.g. adding descriptors of new jobs to be submitted to the scheduling; in particular, through the management interface 270 the system administrator may set the no-limit feedback flag NLF to the desired status.

Figure 3:
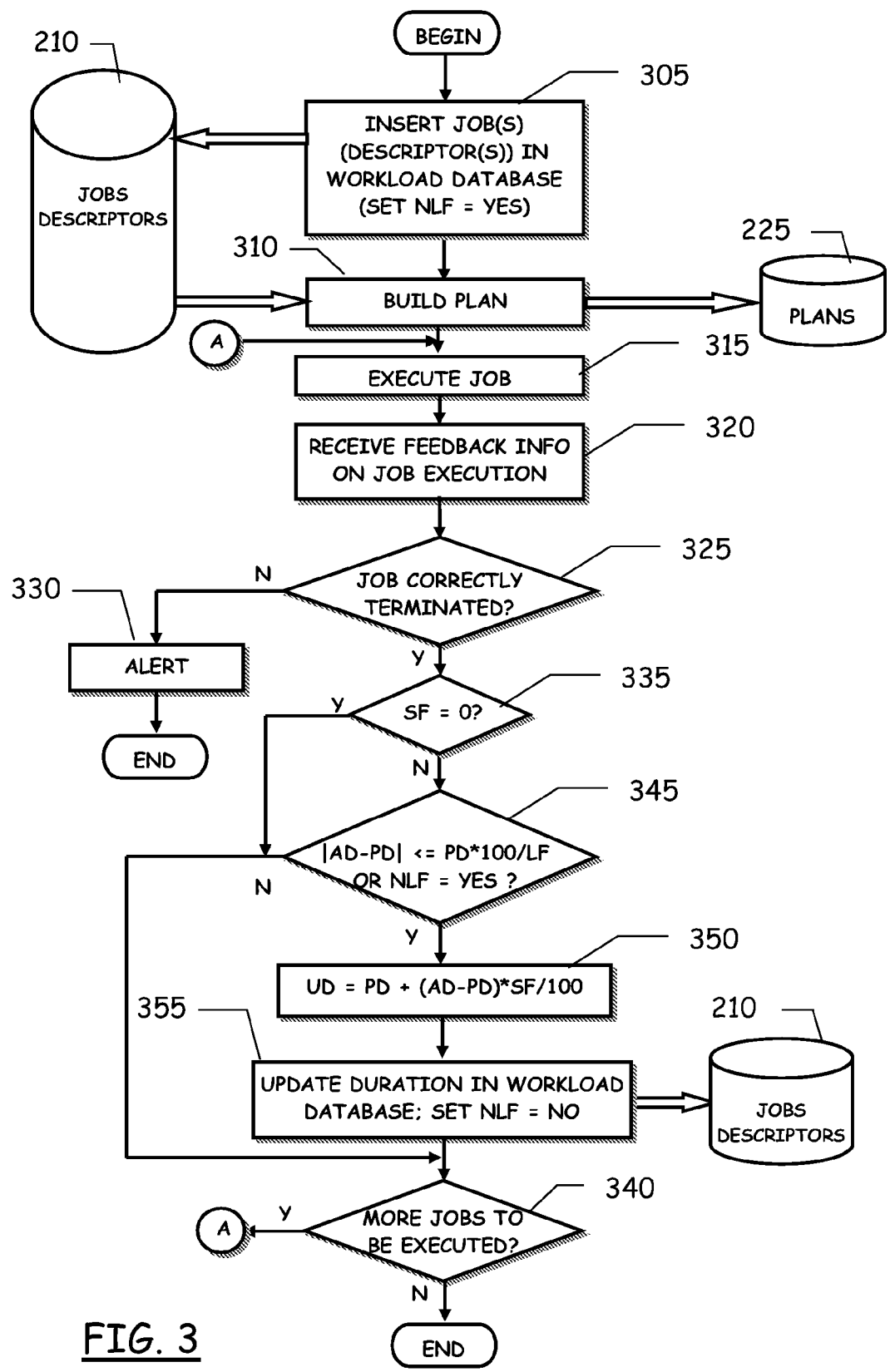
FIG. 3 is a schematic flowchart describing the activities involved in a scheduling method according to an embodiment of the invention.

A method according to an embodiment of the present invention will be now described, making reference to the schematic flowchart of FIG. 3.

A user, for example the administrator of the data processing system 100, prepares descriptors of jobs to be scheduled for execution, and stores them in the workload database 210 (block 305). In particular, the user specifies the jobs' estimated durations, which will be used as planned durations PD; the planned durations are for example the durations estimated during the trials conducted in a test environment (i.e., the estimated durations may significantly differ from the actual jobs' durations expected to be encountered in the production environment 100). The user also specifies the values for the smoothing factor SF, and the limit feedback LF; according to an embodiment of the present invention, the user has the possibility of setting the no-limit feedback flag NLF to a prescribed state, e.g. "YES" (the default state of the no-limit feedback flag NLF being preferably set to the opposite state, e.g. "NO"). For example, referring to the schematic table Table 1 reported in the foregoing, the user may enter descriptors for the two jobs JOBa and JOBb; JOBa has an associated smoothing factor equal to SFa, and a limit feedback equal to LFa; its no-limit feedback flag is set to YES; JOBb has an associated smoothing factor equal to SFb, and a limit feedback equal to LFb; its no-limit feedback flag is set to NO.

In particular, the user may set the no-limit feedback flag to YES when a new job is inserted in the workload database (in such a case, only a roughly estimated planned duration may be available to the user, determined during the tests conducted in the testing environment, which is likely to differ substantially from the actual job duration in the production environment); as another possibility, the user may set the no-limit feedback flag of a generic job, already present in the workload database, to YES, in case of significant changes to the data processing environment, which may cause the actual job duration to significantly depart from the previously calculated duration.

Exploiting the job descriptors stored in the workload database 210, the plan builder module 220 builds an execution plan, which is stored in the plans repository 225 (block 310). For example, the execution plan may provide for the execution of the jobs JOBa and JOBb previously mentioned.

The generated execution plan is submitted to the executor 230, which identifies the jobs of the plan that are available for being executed, according for example to their planned time of execution and their dependencies.

For each job available for execution, the executor module 230 determines the resources (e.g. the execution servers 115) needed for execution and submits the job (block 315).

After submitting to execution the job, e.g. job JOBa, the executor module 230 waits for a feedback information about the job's execution, for example from the agent 245 of the execution server 115 on which the job has been submitted. Once the job execution terminates (either because the job has correctly completed, or because the execution has been deliberately interrupted), the executor module 230 receives the corresponding feedback information (block 320).

The executor module 230 passes the feedback information to the controller module 215, which checks whether the job execution has correctly terminated (decision block 325). In the negative case (decision block 325, exit branch N), an alert signaling is preferably issued (block 330), and the execution of the scheduled plan is for example terminated.

In case the execution of the job has terminated correctly (exit branch Y of decision block 325), the controller module 215 logs it into the workload database 210. The duration update logic module 250 starts a job's duration updating procedure, directed to conditionally updating the planned duration PDa of the job JOBa stored in the workload database 210. In particular, according to an embodiment of the present invention, the duration update logic module 250 retrieves from the workload database 210 the stored planned duration PDa, the smoothing factor SFa, the limit feedback LFa and the no-limit feedback flag NLFa in respect of the job JOBa.

The duration update logic module 250 firstly checks whether the smoothing factor SFa is equal to zero, a condition meaning that no duration update is to be performed (decision block 335). In the affirmative case (exit branch Y of decision block 335), the remaining of the duration update procedure is skipped (the stored planned duration value is left unchanged). The executor module 230 ascertains whether there are other jobs to be executed (decision block 340), like for example the job JOBb and, in the affirmative case (exit branch Y of decision block 340), the remaining jobs are executed (the operation flow jumps back to block 315, as schematized by the connector A).

If the smoothing factor SFa is different from zero (exit branch N of decision block 335), the duration update logic module 250 conditionally calculates an updated job duration value; in particular, the updated job duration value is calculated provided that the following condition is verified:

$$|ADa-PDa|<=PDa*100/LFa \text{ OR } NLFa=YES$$

wherein $|ADa-PDa|$ is the difference between the planned duration PDa and the actual duration ADa (in absolute value), $PDa*100/LFa$ sets the limit (threshold) to the admissible difference between the planned duration PDa and the actual duration ADa, and NLFa=YES is an overriding condition that, if verified, overrides the condition based on the value of the actual duration to planned duration difference. In other words, in case the difference between the planned duration PDa and the actual duration ADa does not exceed the prescribed limit (expressed as a percentage LFa of the planned duration), or, irrespective of the fact that such limit may have been exceeded, in case the user has set the no-limit feedback flag NLFa to YES (exit branch Y of decision block 345), the duration update logic module 250 calculates an updated job duration value (block 350). If the condition above is not verified, i.e., if the difference between the actual job duration and the planned job duration exceeds the prescribed limit, and this is not overridden by the fact that the no-limit feedback flag is set to YES, no updated job duration value is calculated.

In particular, the update duration value is calculated in the following way:

$$UDa=PDa+(ADa-PDa)*SFa/100$$

wherein UDa is the updated duration value for the job JOBa; in other words, the updated duration value is calculated by adding to the previously estimated planned duration PDa a quantity (with algebraic sign) equal to the difference between the actual duration ADa and the planned duration PDa, smoothed to an extent determined by the smoothing factor SFa.

The controller module 215 then causes the calculated updated duration value to replace, in the workload database 210, the previously estimated duration PDa. Additionally, according to a preferred embodiment of the invention, the no-limit feedback flag NLFa is reset to NO (block 355): in this way, the next time the job JOBa is executed, the job duration update procedure will be executed only if the difference between the actual job duration and the planned job duration does not exceed the prescribed, maximum limit; in other words, after the flag NLF is set, the unconditional update of the planned job duration will be performed only once, the first time the job is executed; any subsequent unconditional update of the planned job duration needs a specific intervention by the user, who as to deliberately set the flag NLF to YES.

The executor module 230 checks whether there are other jobs in the plan to be executed (decision block 340). In the affirmative case, the actions described in the foregoing are repeated for the remaining jobs, e.g. for the job JOBb.

Thanks to the present invention, the estimated duration of jobs to be scheduled for execution can be adjusted even in case the difference of the actual job duration compared to the planned duration calculated previously is substantial, particularly exceeding a prescribed limit (normally set to a relatively low value); this makes it possible to automatically adjust the job planned duration even in those cases where it is known in advance that the differences between previously estimated durations and actual durations are substantial, such as when migrating from a testing environment to a production environment, or when making substantial changes to the production environment. It is not necessary to manually re-estimate and update the jobs' durations.

This result is achieved without the necessity of artificially increasing the prescribed deviation limit (set by the limit feedback parameter): it is in fact preferable that the adjustment of the planned duration be performed only if the actual duration does not depart too much from the planned duration, otherwise the planned duration may drift in time due to repeated, not normal job executions.

The implementation of the present invention has been described making reference to an exemplary embodiment thereof, however those skilled in the art will be able to envisage modifications to the described embodiment, as well as to devise different embodiments, without however departing from the scope of the invention as defined in the appended claims.

For example, the provision of a smoothing factor may be dispensed for, and/or the duration update procedure may be not conditioned by the value of the smoothing factor.

Even though in the preceding description reference has been made to non-interactive jobs, this is not to be intended as a limitation; indeed, the method of the invention can be used to schedule the execution of any kind of work units (for example, interactive tasks). Moreover, the proposed method applies to every job or to selected ones only, and to every resource or to some of them only.

The invention can be applied in a data processing system having a different architecture or based on equivalent elements; each computer can have another structure or it can be replaced with any data processing entity (such as a PDA, a mobile phone, and the like). In particular, although described making reference to a distributed data processing system, the invention may also find application in non-distributed data processing systems.

The programs may be pre-loaded onto the hard disks, or be sent to the computers through the data communications network, or be broadcast, or more generally they can be provided in any other form directly loadable into the working memories of the computers.

The method according to the present invention also leads itself to be carried out with a hardware structure (for example, integrated in chips of semiconductor material), or with a combination of software and hardware.

The invention claimed is:

1. A method for scheduling execution of a work unit in a data processing system, the method comprising:
    assigning to the work unit an expected execution duration;
    executing the work unit;
    determining an actual execution duration of the work unit;
    determining a difference between the actual execution duration and the expected execution duration; and conditionally adjusting the expected execution duration associated with the work unit based on the measured actual execution duration, wherein said conditionally adjusting includes preventing the adjustment of the expected execution duration in case said difference exceeds a predetermined threshold,
characterized by further comprising:
associating to the work unit a parameter having a prescribed value adapted to provide an indication of unconditional adjustment of the expected execution duration,
said conditionally adjusting including, when said parameter takes the prescribed value, adjusting the expected execution duration assigned to the work unit based on the measured actual execution duration even if said difference exceeds the predetermined threshold, and after adjusting the expected execution duration, setting the parameter to a value different from said prescribed value, said different value not providing said indication of unconditional adjustment of the expected execution duration.

2. The method according to claim 1, in which said adjusting includes smoothing the difference between the actual execution duration and the expected duration, said smoothing depending on a smoothing factor.

3. The method according to claim 2, in which said conditionally adjusting includes unconditionally preventing the adjustment of the expected execution duration in case said smoothing factor takes a prescribed value, particularly 0.

4. The method according to claim 1, in which said parameter is user-configurable.

5. The method according to claim 1, in which said parameter is included in a work unit descriptor containing data descriptive of the work unit used for scheduling the work unit execution.

6. A computer program directly loaded into the working memory of a data processing system and comprising computer program code adapted to perform, when the program is executed by the data processing system, a method for scheduling execution of a work unit in a data processing system, the method comprising:
assigning to the work unit an expected execution duration;
executing the work unit;
determining an actual execution duration of the work unit;
determining a difference between the actual execution duration and the expected execution duration; and
conditionally adjusting the expected execution duration associated with the work unit based on the measured actual execution duration, wherein said conditionally adjusting includes preventing the adjustment of the expected execution duration in case said difference exceeds a predetermined threshold,
the method further comprising:
associating to the work unit a parameter having a prescribed value adapted to provide an indication of unconditional adjustment of the expected execution duration,
said conditionally adjusting including, when said parameter takes the prescribed value, adjusting the expected execution duration assigned to the work unit based on the measured actual execution duration even if said difference exceeds the predetermined, and after adjusting the expected execution duration, setting the parameter to a value different from said prescribed value, said different value not providing said indication of unconditional adjustment of the expected execution duration.

7. The computer program according to claim 6, in which said adjusting includes smoothing the difference between the actual execution duration and the expected duration, said smoothing depending on a smoothing factor.

8. The computer program according to claim 7, in which said conditionally adjusting includes unconditionally preventing the adjustment of the expected execution duration in case said smoothing factor takes a prescribed value, particularly 0.

9. The computer program according to claim 6, in which said parameter is user-configurable.

10. The computer program according to claim 6, in which said parameter is included in a work unit descriptor containing data descriptive of the work unit used for scheduling the work unit execution.

11. A data processing system for scheduling execution of a work unit including:
a storage device including a storage medium, wherein the storage device stores computer usable program code;
a processor, wherein the processor executes the computer usable program code;
a scheduler adapted to scheduling execution of a work unit;
a work unit descriptor including data used by the scheduler for said scheduling, wherein said data includes an expected execution duration assigned to the work unit, and a parameter having a prescribed value adapted to provide an indication of unconditional adjustment of the expected execution duration,
an execution controller adapted to determine a difference between a measured, actual execution duration and the expected execution duration of the work unit;
a duration update module adapted to conditionally adjust the expected execution duration assigned to the work unit based on the measured actual execution duration, wherein said conditionally adjusting includes preventing the adjustment of the expected execution duration in case said difference exceeds a predetermined threshold, unless said parameter takes the prescribed value, after adjusting the expected execution duration, setting the parameter to a value different from said prescribed value, said different value not providing said indication of unconditional adjustment of the expected execution duration.

12. The data processing system according to claim 11, in which said adjusting includes smoothing the difference between the actual execution duration and the expected duration, said smoothing depending on a smoothing factor.

13. The data processing system according to claim 12, in which said conditionally adjusting includes unconditionally preventing the adjustment of the expected execution duration in case said smoothing factor takes a prescribed value, particularly 0.

14. The data processing system according to claim 11, in which said parameter is user-configurable.

15. The data processing system according to claim 11, in which said parameter is included in a work unit descriptor containing data descriptive of the work unit used for scheduling the work unit execution.

* * * * *